United States Patent
Ismert et al.

(10) Patent No.: US 7,197,777 B2
(45) Date of Patent: Apr. 3, 2007

(54) COLLAR FOR A WATER PIPE SUPPLY

(75) Inventors: Joseph P. Ismert, Kansas City, MO (US); Frank D. Julian, Kansas City, MO (US)

(73) Assignee: Sioux Chief Mfg. Co., Inc., Peculiar, MO (US)

( * ) Notice: Subject to any disclaimer, the term of this patent is extended or adjusted under 35 U.S.C. 154(b) by 137 days.

(21) Appl. No.: 10/891,788

(22) Filed: Jul. 15, 2004

(65) Prior Publication Data

US 2006/0010595 A1    Jan. 19, 2006

(51) Int. Cl.
E03C 1/04         (2006.01)
E03D 11/00        (2006.01)

(52) U.S. Cl. .................. 4/675; 4/252.1; 4/252.3; 4/252.4

(58) Field of Classification Search ............ 4/675–678, 4/252.1, 252.3, 252.4, 252.5, 252.6; 285/46; 220/241, 242
See application file for complete search history.

(56) References Cited

U.S. PATENT DOCUMENTS

| | | | | |
|---|---|---|---|---|
| 1,725,987 A | * | 8/1929 | Samuel .................. | 285/46 |
| 3,615,108 A | * | 10/1971 | Toth ..................... | 285/46 |
| 4,385,777 A | * | 5/1983 | Logsdon ................ | 285/46 |
| 4,516,749 A | * | 5/1985 | Sullivan ................ | 248/56 |
| 4,662,389 A | * | 5/1987 | Igbal .................... | 4/675 |
| 4,672,994 A | * | 6/1987 | Ko ....................... | 4/695 |
| 5,236,229 A | * | 8/1993 | Gonzalez ............... | 285/46 |
| 5,447,338 A | * | 9/1995 | Kikuchi ................. | 285/46 |
| 6,533,041 B1 | * | 3/2003 | Jensen ................... | 169/37 |
| 6,659,124 B2 | * | 12/2003 | Burns et al. ............. | 4/675 |
| 6,691,331 B2 | * | 2/2004 | Gallacher et al. ......... | 4/252.5 |

OTHER PUBLICATIONS

Sioux Chief Catalog 2004, p. 191, TRIM TITE shallow escutcheon, on sale more than one year prior to the filing date of this application.

* cited by examiner

*Primary Examiner*—Khoa D. Huynh
(74) *Attorney, Agent, or Firm*—Erickson & Kleypas, LLC

(57) ABSTRACT

A flexible, plastic collar for sealing the space between a water supply line or pipe and a wall aperture, the collar including an annular, generally conical surface, a convex front face, a concave rear face, a centered opening provided with a sleeve for receiving and sealing against the pipe, a tapered edge for sealing against the wall and an annular ridge for preventing over-deflection of the collar when pressed against the wall.

21 Claims, 2 Drawing Sheets

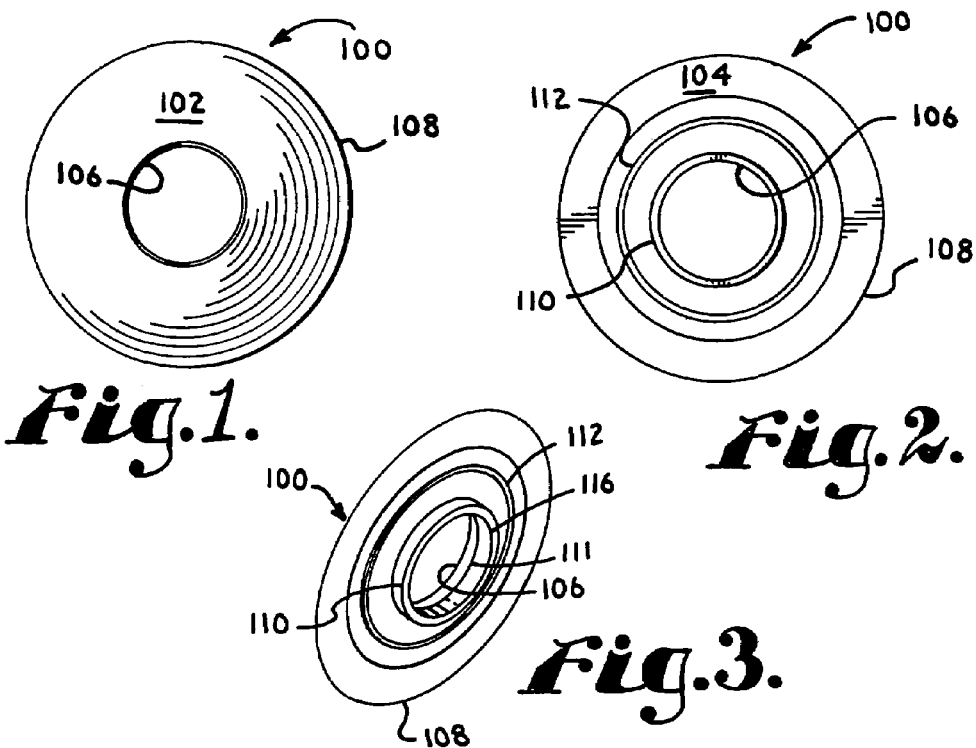
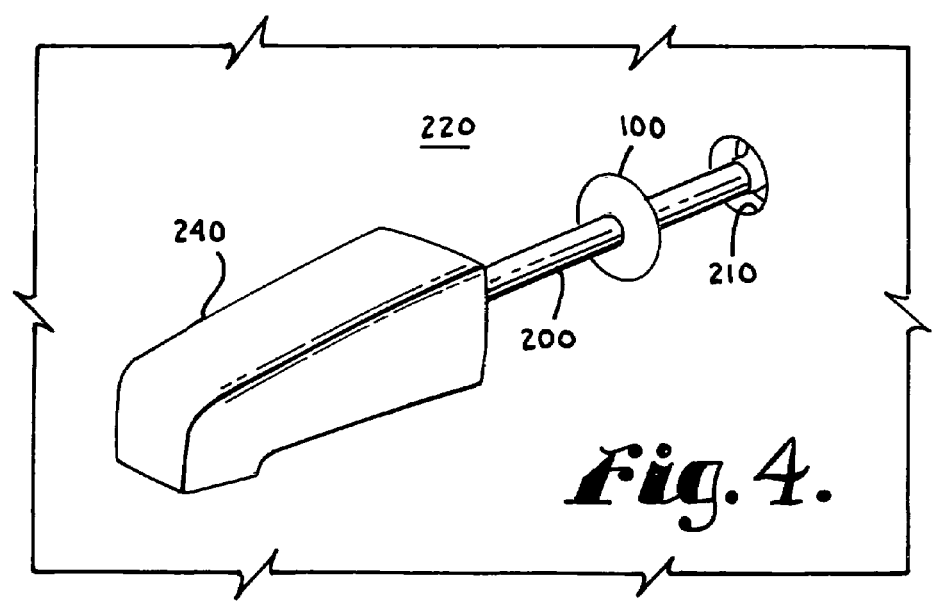

COLLAR FOR A WATER PIPE SUPPLY

BACKGROUND OF THE INVENTION

This invention relates to seals for wall-mounted plumbing fixtures such as shower heads and tub spouts that are supplied with water through a water supply pipe projecting through an aperture in a nearby wall, and, more particularly, to a collar that is mounted on a water supply pipe to prevent water from infiltrating the aperture.

Water supplies for shower heads and tub spouts are typically provided by one of two standard methods. In the first method, a 90 degree elbow fitting is securely fastened behind the finished wall at the level required for the tub spout or shower head connection. A precise length of a water supply pipe with male threaded nipples on each end is installed blindly through a hole or aperture in the finished wall and onto the elbow fitting enclosed within the wall. The tub spout or shower arm is then threaded directly onto the open end of the pipe. In a second method used for tub spouts, copper or other rigid pipe is stubbed out of the wall through the aperture and a specially designed compression-type tub spout is slid over the pipe and secured by means of an integral clamp or set screw built into the spout's housing.

Unfortunately, the connection made between the pipe and shower arm or between the pipe and tub spout may loosen over time, or, as in the case of the second method above, the o-ring necessary for the compression-type tub spout to seal against the pipe may become damaged during installation. In either case, due to a loose or faulty connection, water can trickle from the connection point rearward along the pipe either as a small jet of pressurized water or simply via adherence of the water to the pipe through surface tension. Although an escutcheon is sometimes provided with shower head assemblies it is typically not adapted to fit tightly and seal against the pipe. In the case of tub spouts, the housing of the spout is usually simply pressed against the wall. Although caulk may be applied around the housing to prevent water in the tub from splashing behind the housing, leakage within the housing itself may travel unobstructed along the stub out pipe and enter the wall through the aperture.

It is known that plumbers will modify a polyethylene escutcheon, of the type sold as the Trim Tite™ shallow escutcheon and listed on page 191 of the Sioux Chief Manufacturing Co, Inc. catalog, to create a seal for preventing water from traveling along the stub out pipe and entering the wall through the aperture. The seal is typically formed by trimming the peripheral leg or wall from the escutcheon to form a cupped, annular collar. Although such a modified escutcheon may provide a seal around the pipe, the peripheral edge does not typically form a consistent seal with the wall thereby allowing water to infiltrate behind the escutcheon and into the wall through the aperture.

It is clear that there exists a need for a device for use in association with the stub out pipe for fixtures such as tub spouts and shower heads that forms a watertight seal around the stub out pipe to block water from moving past it, and which forms a seal with the wall while covering the aperture therein.

BRIEF DESCRIPTION OF THE INVENTION

A device for sealing an aperture between a pipe and a surrounding wall, the device including a frustoconical, annular collar having a convex front face, a concave rear face, a centered opening, and a tapered edge defining the perimeter. A sleeve defines the centered opening and projects rearward from the rear face. An annular ridge, concentric to the opening and located between the opening and the perimeter, also projects rearward from the rear face. In use, the collar is fitted onto a plumbing pipe projecting through an aperture in a wall so that a rear face of the collar faces the wall. The sleeve within the collar seals against the pipe. The collar is pressed by the user against the wall to cover the aperture and advance the outer periphery of the collar into sealing engagement with the wall. The annular ridge acts to prevent the collar from over-deflecting when such pressure is applied, thereby maintaining the perimeter of the collar in contact with the wall. A tub spout or other fixture may then be connected to the plumbing pipe. Should the connection leak, causing water to spray or trickle towards the wall, the collar serves to deflect the water and prevent it from passing through the aperture.

As used herein, the terms convex and concave are not intended to be limited to curved surfaces, instead the term convex when used in describing the front face is intended to indicate that the front face slopes or curves rearward and outward from front to back as generally shown in FIGS. 5 and 6. Similarly, the term concave when used in describing the rear face is intended to indicate that the rear face slopes or curves rearward and outward from the front to the back of the collar as generally shown in FIGS. 5 and 6.

Other advantages of the invention will become apparent from the following description taken in connection with the accompanying drawings, wherein is set forth by way of illustration and example an embodiment of the present invention.

BRIEF DESCRIPTION OF THE DRAWINGS

FIG. 1 is a front elevation of the pipe collar showing the convex front face, opening and perimeter.

FIG. 2 is a rear elevation of the pipe collar showing the concave rear face, the nd the annular ridge.

FIG. 3 is a rear perspective of the pipe collar.

FIG. 4 is an environmental view of the pipe collar engaged with a water supply

DETAILED DESCRIPTION

Figure 5:
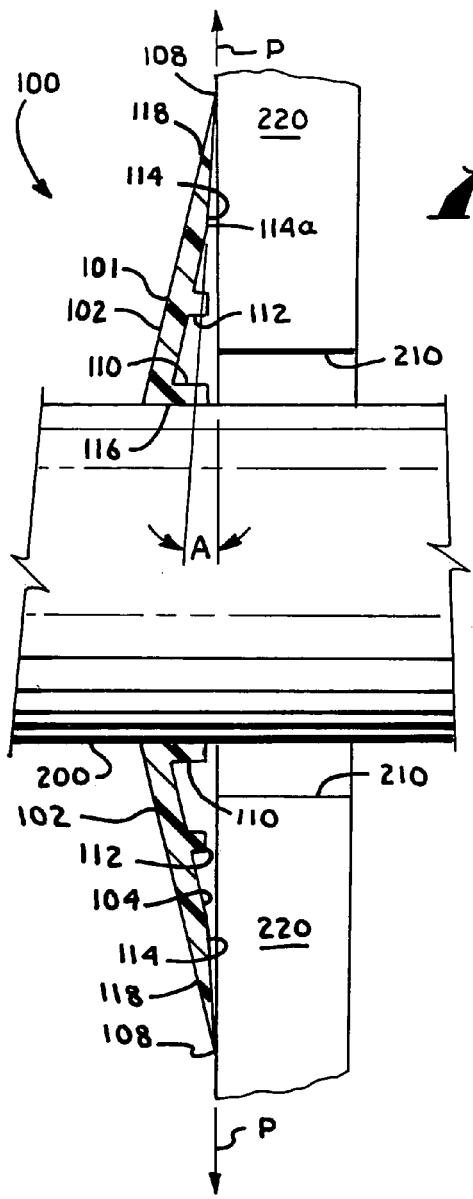
FIG. 5 is a partial sectional view of the pipe collar showing a gap between the ry sealing surface and the wall.

As required, a detailed embodiment of the present invention is disclosed herein; however, it is to be understood that the disclosed embodiment is merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring now to FIGS. 1 through 6 of the drawings, there is shown a pipe collar of the present invention indicated by the reference numeral 100. As illustrated, particularly in FIGS. 1 through 3, the pipe collar 100 presents a flexible, cupped, annular ring 101 which is generally conical or frustoconical in shape, having a convex front face 102, a concave rear face 104, a centered opening 106 sized to accommodate a plumbing pipe and a generally circular perimeter 108. An integral sleeve 110 defines the opening 106 and projects rearward from the rear face 104 terminating forward of an imaginary plane P in which the perimeter lies. In FIG. 3, the sleeve 110 presents a circular wall enclosing the opening 106.

Figure 6:
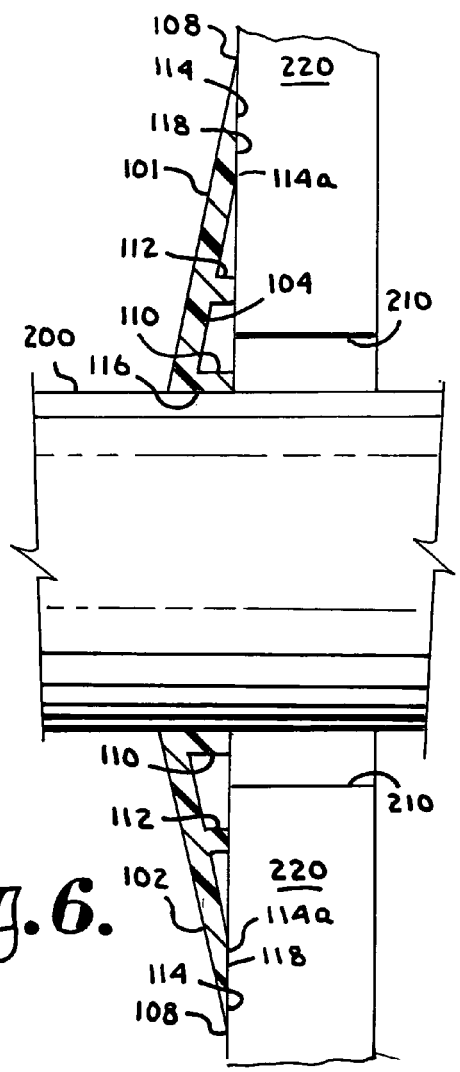
FIG. 6 is a partial sectional view of the pipe collar showing the gap of FIG. 5 nd the secondary sealing surface in full contact with the wall.

An annular ridge 112 also projects rearward from the rear face 104 and terminates forward of the imaginary plane P defined by the perimeter 108. Referring to FIGS. 5 and 6, the distances between the sleeve 110 and the imaginary plane and between the ridge 112 and the imaginary plane should be similar but need not be precisely equal. The ridge 112 is concentric to the opening 106 and its radius is intermediate to those of the opening 106 and the perimeter 108.

As shown in FIGS. 5 and 6, the cross-sectional thickness of the collar 100 decreases in a tapered rim or edge portion 118 as it approaches and defines the perimeter 108. Because the collar 100 is formed of flexible material such as plastic (appropriate plastics including polyethylene and polypropylene), the collar 100 flexes or deforms slightly when pressure is applied to the front face 102. Such flexion or deformation is greatest near the perimeter 108 where the collar 100 material is thinnest.

In use, the collar 100 is fitted over a plumbing pipe, such as a water supply pipe 200, projecting through an aperture 210 in a wall 220. When the inner or rear face 104 of the collar 100 is pressed against the wall 220 it covers the aperture 210 preventing water from splashing or trickling along the pipe 200 and through the aperture 210. A plumbing fixture such as a tub spout 240 may then be connected in fluid communication with the pipe 200 to receive water therefrom. Should the connection leak, resulting in water spraying or running along the pipe 200 in the direction of the wall 220, the outer or front face 102 of the collar 100 will deflect the water allowing it to run down the outer surface of the wall 220.

In addition to physically blocking the wall aperture 210, the collar is provided with primary 116 and secondary 114 sealing surfaces. The primary sealing surface 116 defines the opening 106 in the collar 100 and comprises the inner surface of the sleeve 110 which is sized to fit tightly against the outer surface of the pipe 200. Upon insertion of the pipe 200 through the opening 106, the primary sealing surface encircles the pipe 200 in continuous contact, thereby providing a substantially water-tight primary seal. The rearward portion of the sleeve 110, or of the inner surface of the sleeve 110, may flair outward slightly to facilitate insertion of the pipe 200 into the opening 106. In this case, a forward or medial portion of the inner surface of the sleeve 110 (constricted portion 111) may be formed to have a diameter slightly smaller than that of the pipe 200, whereby the pipe 200 may be readily engaged with the flared, rearward portion of the sleeve 110 and yet form a tight seal against the constricted portion 111 by deforming the constricted portion 111 outward and around the outer surface of the pipe 200.

The secondary sealing surface 114 comprises a portion of the rear face 104 proximate and concentric to the perimeter 108. As best seen in FIG. 5, the secondary sealing surface 114 is angled to its inward edge 114a at an angle A of approximately 5 degrees forward of the plane P of the perimeter 108 and is therefore slightly conical. Alternative embodiments may include sealing surfaces 114 angled to a lesser or greater extent, typically having an angle A within the range of 0 to 15 degrees. The outer edge of the secondary sealing surface 114 is coexistent with the perimeter 108 of the collar 100.

As shown in FIGS. 5 and 6, when the rear face 104 of the collar 100 is placed upon a planar surface such as a wall 220, the initial point of contact between the rear face 104 and the wall 220 is along the tapered edge 118 of the perimeter 108; the ridge 112 and sleeve 110 standing off from the wall 220 slightly. The diameter of the ridge 112 is sized to exceed the typical diameter of aperture 210. When the collar 100 is pressed further against the wall 220, the portion of the collar proximate the tapered edge 118 flexes until contact between the ridge 112 and the wall 220 limits further flexion. At the same time, the inward edge 114a of the secondary sealing surface 114 flexes approximately 5 degrees rearward to flatten the secondary sealing surface 114 against the wall 220, thereby forming a secondary seal.

It is to be understood that while certain forms of this invention have been illustrated and described, it is not limited thereto except insofar as such limitations are included in the following claims and allowable equivalents thereof.

Having thus described the invention, what is claimed as new and desired to be secured by Letters Patent is as follows:

1. A collar for sealing an aperture between a pipe and a surrounding planar surface, said collar comprising:
    a flexible annular ring having a convex front face, a concave rear face, a centered opening, a perimeter and a tapered edge portion proximate said perimeter wherein the thickness if said annular ring decreases toward said perimeter, and
    a sleeve defining said centered opening, said sleeve projecting rearwardly from said rear face and terminating forward of a plane defined by said perimeter, whereby
    when said collar is placed around a pipe extending outwardly from a planar surface the initial point of contact between said rear face and the planer surface is at said perimeter, and when said collar is pressed further against the planar surface said annular ring flexes until contact between said rear face radially inward of said perimeter and said planar surface limits further flexion.

2. The collar of claim 1, wherein said annular ring is generally frustoconical in shape.

3. The collar of claim 1, wherein said sleeve is sized to tightly receive the pipe.

4. The collar of claim 1, wherein said rear face of said annular ring in said tapered edge portion forms an angle with said plane of approximately 0 to 15 degrees.

5. The device collar of claim 1, wherein said rear face of said annular ring in said tapered edge portion forms an angle with said plane of approximately 5 degrees.

6. The collar of claim 1, wherein said collar is formed from a flexible plastic.

7. The collar claim 1, wherein said collar is formed from plastic selected from the group consisting of polyethylene and polypropylene.

8. The collar of claim 1 wherein said rear face includes an annular ridge concentric to said opening and radially intermediate to said opening and said perimeter, said ridge projecting rearward from said rear face and terminating forward of said plane.

9. The collar of claim 8, wherein when said collar is pressed further against said planar surface said annular ring flexes until contact between said ridge and said planar surface limits further flexion.

10. A collar for sealing an aperture between a pipe and a surrounding planar surface, said collar comprising:
    a generally conical, flexible annular ring having a convex front face, a concave rear face, a perimeter and a tapered edge portion proximate said perimeter wherein the thickness if said annular ring decreases toward said perimeter, and an annular ridge concentric to said opening and radially intermediate to said opening and said perimeter, said ridge projecting axially rearward from said rear face and terminating forward of said plane, whereby when said collar is placed around a pipe extending outwardly from a planar surface the initial point of contact between said rear face and the planer surface is at said perimeter, and when said collar is pressed further against the planar surface said annular ring flexes until contact between said ridge and said planar surface limits further flexion.

11. The collar of claim 10, wherein said rear face of said annular ring in said tapered edge portion forms an angle with said plane of approximately 5 degrees.

12. The collar of claim 10, wherein said rear face of said annular ring in said tapered edge portion forms an angle with said plane of approximately 0 to 15 degrees.

13. The collar of claim 10, wherein said collar is formed from a flexible plastic.

14. The collar of claim 10, wherein said collar is formed from plastic selected from the group consisting of polyethylene and polypropylene.

15. A collar for sealing a space around a plumbing pipe, comprising:

a flexible annular ring having a convex front face, a concave rear face, a circular, centered opening sized to accommodate a plumbing pipe, and a circular perimeter, a primary sealing surface defining said opening, whereby upon insertion of said pipe through said opening said primary sealing surface encircles said pipe in continuous contact with said pipe, thereby providing a substantially water-tight primary seal, and a secondary sealing surface comprising a portion of said concave rear face of said annular ring proximate said perimeter thereof, said secondary sealing surface extending from said perimeter to an inward edge radially inward of said perimeter and angled approximately 5 degrees forward of the plane of the perimeter, whereby, when said rear face is pressed with sufficient force against a planar support surface said secondary sealing surface flexes rearwardly to flatten said secondary sealing surface against said support surface, thereby forming a secondary seal.

16. The collar of claim 15 and further including an annular ridge concentric to said opening and radially intermediate said opening and said inward edge of said secondary sealing surface, said ridge projecting rearwardly from said rear face and terminating forward of the plane of said perimeter, said annular ridge contacting the planar surface as said secondary sealing surface seals against the planar surface and prevents further advancement of said collar against the planar surface.

17. A collar for sealing an aperture between a planar surface and a pipe extending outwardly therefrom, said collar comprising a flexible annular ring having a convex front face, a concave rear face, a centered opening sized to receive the pipe in sealing engagement therewith, and a perimeter defining a plane, an annular portion of said rear face adjacent said perimeter having a forward angle away from said plane and forming a secondary sealing surface such that when said collar is placed around the pipe and advanced toward the planar surface, the initial point of contact between said rear face and the planer surface is at said perimeter and when said collar is further advanced against the planar surface said annular ring flexes until said secondary sealing surface seats against the planar surface in sealing engagement therewith.

18. The collar of claim 17 and further including an annular ridge concentric to said opening and radially intermediate said opening and said perimeter, said ridge projecting rearwardly from said rear face and terminating forward of said plane, said annular ridge contacting the planar surface as said secondary sealing surface seals against the planar surface and prevents further advancement of said collar against the planar surface.

19. The collar of claim 17 wherein said forward angle of said secondary sealing surface relative to the plane defined by said perimeter of said annular ring is approximately five degrees.

20. The collar of claim 17 wherein said secondary sealing surface extends from said perimeter to an inward edge radially intermediate said opening and said perimeter.

21. The collar of claim 20 and further including an annular ridge concentric to said opening and radially intermediate said opening and said inward edge of said secondary sealing surface, said ridge projecting rearwardly from said rear face and terminating forward of said plane, said annular ridge contacting the planar surface as said secondary sealing surface seals against the planar surface and prevents further advancement of said collar against the planar surface.

* * * * *